US011242907B2

(12) United States Patent
Ruhmann et al.

(10) Patent No.: US 11,242,907 B2
(45) Date of Patent: Feb. 8, 2022

(54) ADJUSTABLE VIBRATION DAMPER

(71) Applicant: ZF FRIEDRICHSHAFEN AG, Friedrichshafen (DE)

(72) Inventors: Lukas Ruhmann, Memmelsdorf (DE); Thomas Manger, Wasserlosen (DE); Stefan Schmitt, Gochsheim (DE); Bernd Zeissner, Volkach (DE); Thomas Solf, Sulzheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 67 days.

(21) Appl. No.: 16/650,207

(22) PCT Filed: Aug. 13, 2018

(86) PCT No.: PCT/EP2018/071854
§ 371 (c)(1),
(2) Date: Mar. 24, 2020

(87) PCT Pub. No.: WO2019/057394
PCT Pub. Date: Mar. 28, 2019

(65) Prior Publication Data
US 2020/0232532 A1 Jul. 23, 2020

(30) Foreign Application Priority Data
Sep. 25, 2017 (DE) .................... 10 2017 216 919.2

(51) Int. Cl.
F16F 9/34 (2006.01)
F16F 9/46 (2006.01)
(Continued)

(52) U.S. Cl.
CPC ............... *F16F 9/46* (2013.01); *B60G 17/08* (2013.01); *B60G 2202/24* (2013.01);
(Continued)

(58) Field of Classification Search
CPC ...... F16F 9/096; F16F 9/19; F16F 9/22; F16F 9/325; F16F 9/348; F16F 9/466; F16F 9/516; B60G 13/08; B60G 17/08
(Continued)

(56) References Cited

U.S. PATENT DOCUMENTS 5,375,683 A * 12/1994 Huang .................... F16F 9/096
188/266.6
5,934,421 A * 8/1999 Nakadate ................ F16F 9/348
188/299.1
(Continued)

FOREIGN PATENT DOCUMENTS

DE 3406875 9/1985
DE 102005053394 5/2006
(Continued)

OTHER PUBLICATIONS

Office Action of the corresponding German Patent Application No. 10 2017 216 919.2.

*Primary Examiner* — Christopher P Schwartz
(74) *Attorney, Agent, or Firm* — Cozen O'Connor

(57) ABSTRACT

An adjustable vibration damper includes at least one adjustable damping valve, with a piston at a piston rod that divides a cylinder into a work chamber on the piston rod side and a work chamber on the side remote of the piston rod. The cylinder is at least partially enclosed by an intermediate tube that forms a fluid connection between one of the work chambers and the adjustable damping valve. A hydraulic apparatus is connected to the fluid connection of the one work chamber via a first line and to the other work chamber via a second line.

8 Claims, 9 Drawing Sheets

(51) Int. Cl.
*B60G 17/08* (2006.01)
*F16F 9/32* (2006.01)

(52) U.S. Cl.
CPC .... *B60G 2202/416* (2013.01); *B60G 2500/11* (2013.01); *F16F 9/325* (2013.01); *F16F 9/34* (2013.01)

(58) Field of Classification Search
USPC ......... 188/299.1, 315, 322.13, 322.19, 322.2
See application file for complete search history.

(56) References Cited

U.S. PATENT DOCUMENTS

| | | | | |
|---|---|---|---|---|
| 10,400,844 | B2* | 9/2019 | Schmidt | F16F 9/3257 |
| 10,514,077 | B2* | 12/2019 | Zeissner | F16F 9/325 |
| 10,539,202 | B2* | 1/2020 | Jee | F16F 9/346 |
| 2004/0134730 | A1* | 7/2004 | Forster | F16F 9/46 |
| | | | | 188/314 |
| 2014/0090941 | A1* | 4/2014 | Shibahara | F16F 9/325 |
| | | | | 188/315 |
| 2018/0355940 | A1* | 12/2018 | Manger | F16F 9/325 |

FOREIGN PATENT DOCUMENTS

| | | |
|---|---|---|
| DE | 102010021777 | 1/2011 |
| DE | 102014225930 | 6/2016 |
| DE | 102015214651 | 2/2017 |
| EP | 3211263 | 8/2017 |
| WO | WO 2016184624 | 11/2016 |
| WO | WO 2017137189 | 8/2017 |

* cited by examiner

ADJUSTABLE VIBRATION DAMPER

CROSS REFERENCE TO RELATED APPLICATIONS

This is a U.S. national stage of Application No. PCT/EP2018/071854 filed Aug. 13, 2018. Priority is claimed on German Application No. DE 10 2017 216 919.2 filed Sep. 25, 2017 the content of which is incorporated herein by reference.

BACKGROUND OF THE INVENTION

1. Field of the Invention

The invention is directed to an adjustable vibration damper

2. Description of Related Art

An adjustable vibration damper is known from DE 10 2014 225 930 A1. The adjustable vibration damper has a hydraulic apparatus connected to a work chamber on a piston rod side and to a work chamber on a side remote of the piston rod to circulate hydraulic medium between the two work chambers. This document describes the vibration damper without giving design details.

An adjustable vibration damper with two externally adjustable vibration dampers has at least one intermediate tube that virtually completely outwardly envelops a cylinder in which the piston rod slides and which forms the two work chambers. DE 10 2005 053 394 A1 is cited by way of example.

Based on DE 10 2005 053 394 A1, it appears impossible to realize a vibration damper with the operating principle according to DE 10 2014 225 930 A1. The length of the intermediate tube could be shortened to achieve radial access to the intermediate tube. This would also entail a loss of usable stroke length of the piston rod because, otherwise, the piston could be located axially outside of a connection opening between the work chamber on the piston rod side and an intermediate tube and, therefore, no damping medium would be displaced into the adjustable damping valve.

Alternatively, according to DE 34 006 875 A1 one damping valve could be arranged in the area of the piston rod guide and one damping valve could be arranged in the area of the cylinder base. An intermediate tube could then be dispensed with because the damping medium would be connected directly to the respective work chamber. However, this would require different constructional forms of the adjustable damping valve, and different constructional forms of the adjustable damping valves would render the product disproportionately expensive.

SUMMARY OF THE INVENTION

One aspect of the present invention is a solution for connecting a hydraulic apparatus to the two work chambers of the vibration damper with at least one intermediate tube.

According to one aspect of the invention, a hydraulic apparatus is connected to the fluid connection of the one work chamber via a first line and to the other work chamber via a second line.

As a result of the insight that the fluid line hydraulically constitutes a part of the adjoining work chamber, the design freedom with respect to the arrangement of the hydraulic apparatus is appreciably expanded. An intermediate tube of optimal length can be employed in spite of the hydraulic apparatus.

In a further advantageous configuration, the two work chambers have a fluid connection to an adjustable damping valve in each instance and the hydraulic apparatus is connected by its lines to a fluid connection in each instance. Owing to the identical arrangement of the lines, identical connection conditions are also present so that a standardization of the component parts is possible.

According to one aspect of the invention, the intermediate tube has a separate hydraulic connection for the adjustable damping valve and for the line to the hydraulic apparatus, respectively. This expands the possibility for optimal placement of the hydraulic apparatus relative to the adjustable damping valve.

With a view to an optimally short connection area at the intermediate tube, the hydraulic connection for the hydraulic apparatus is constructed to be offset in circumferential direction with respect to a hydraulic connection for the adjustable damping valve.

Further, so that the intermediate tube can be constructed as a comparatively simple component part, the hydraulic device has at least one connection sleeve connected to the fluid connection so as to engage in the hydraulic connection in the intermediate tube.

It is further provided that the connection sleeve is constructed as a component part separate from a connection socket for the hydraulic device at the vibration damper. Accordingly, a certain play can be maintained to compensate for dimensional deviations between the hydraulic connection and the connection socket.

The connection socket advantageously comprises a bottom part and a cover that form a housing in which the connection sleeve is fixed. The housing has guide surfaces for positioning the connection sleeve.

In this regard, it is provided that at least one connection sleeve is supported with respect to the bottom part to be displaceable radially relative to the longitudinal axis of the connection sleeve. The displaceability determines the tolerance compensation.

To ensure a reliable fixing of the connection sleeve on the other hand, the connection sleeve has a supporting flange via which the connection sleeve is fixed.

The connection sleeve is fixed in longitudinal direction of the connection sleeve at least indirectly between the bottom part and the cover of the connection socket. The connection sleeve itself does not require an additional threaded area or the like and can therefore be constructed in a space-saving manner and with a simple geometry.

Optionally, the hydraulic device can be fastened to the connection socket. This mode of construction offers the possibility that when the hydraulic apparatus is fastened the cover is also fastened together with the bottom part of the connection socket.

Alternatively, the connection socket can have line connections for a separately arranged hydraulic device so that the hydraulic device can be arranged flexibly with respect to the vibration damper.

BRIEF DESCRIPTION OF THE DRAWINGS

The invention will be described in more detail referring to the following description of the figures.

DETAILED DESCRIPTION OF THE PRESENTLY PREFERRED EMBODIMENTS

Figure 1:
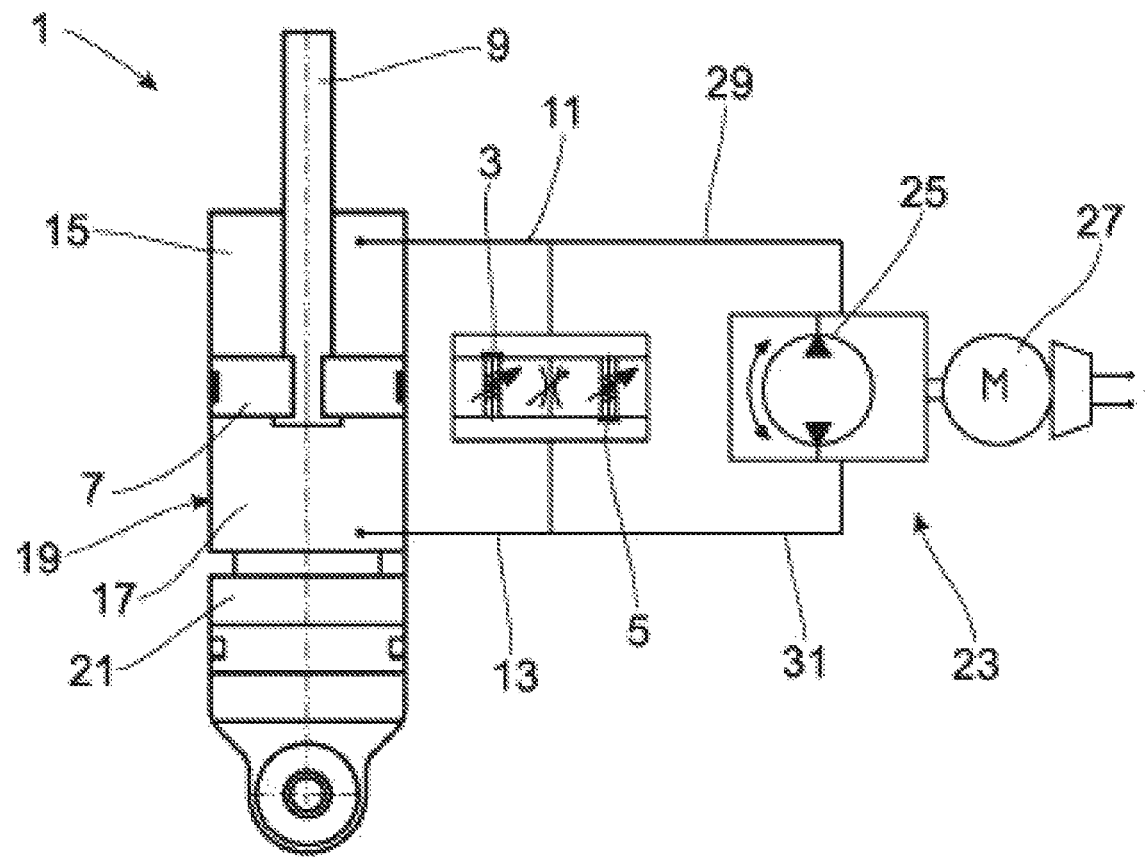
FIG. 1 is an adjustable vibration damper.

FIG. 1 shows the equivalent diagram of an adjustable vibration damper 1 with adjustable damping valves 3; 5, for a movement direction of a piston 7 at a piston rod 9. The two adjustable damping valves 3; 5 are connected to work chambers 15; 17, respectively, via a fluid connection 11; 13.

The piston 7 divides a cylinder 19 into a work chamber 15 on a piston rod side and a work chamber 17 remote of the piston rod. A compensation space serves to compensate for the damping medium volume displaced by the piston rod 7.

Hydraulically parallel to the two damping valves 3; 5, the vibration damper 1 has a hydraulic apparatus 23 comprising a pump 25 with two conveying directions and a drive motor 27, preferably an electric motor. The hydraulic apparatus 23 is likewise connected to the two work chambers 15; 17 via two lines 29; 31 and accordingly allows damping medium to be circulated between work chambers 15; 17 so as to exert additional actuating forces on the piston rod 9.

Figure 2:
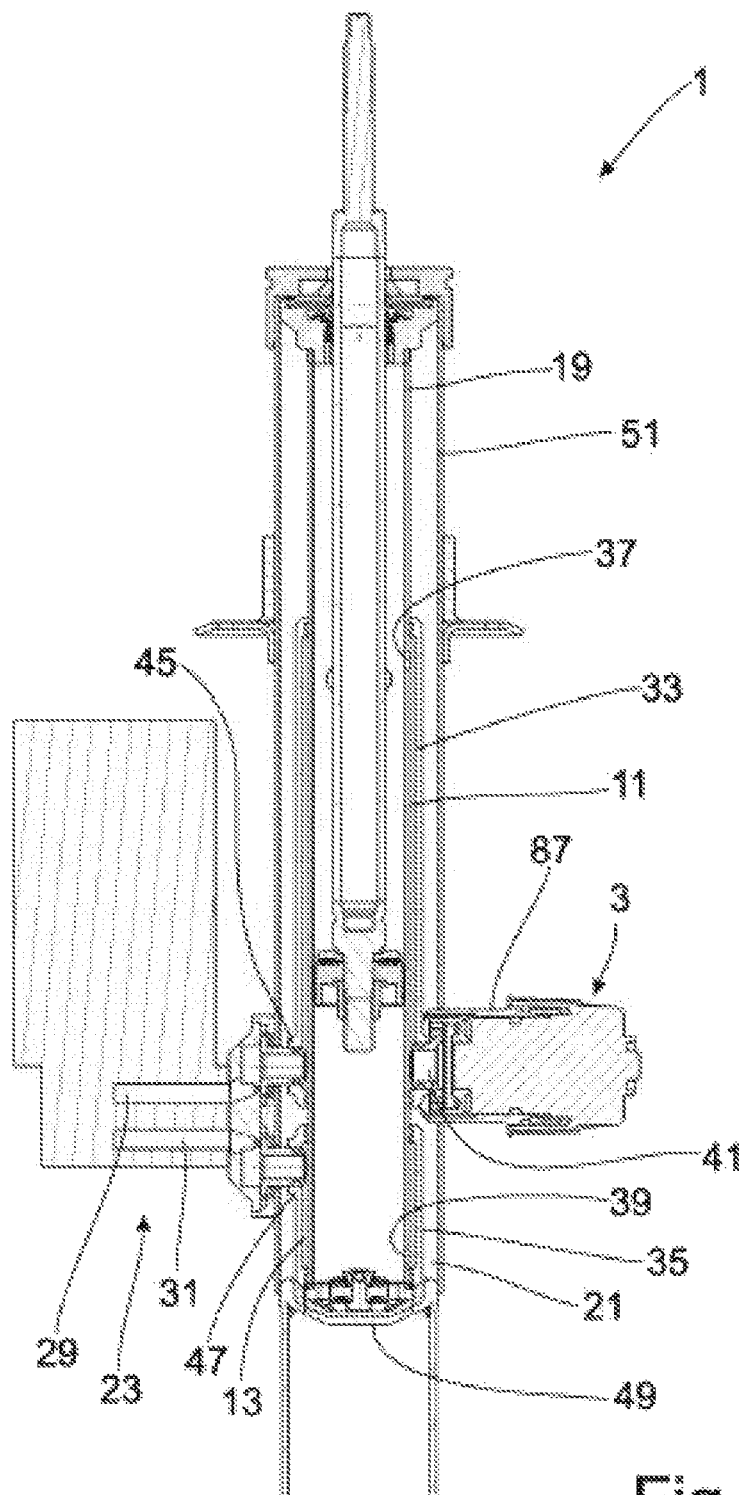
FIGS. 2 and 3 are sectional views of a vibration damper.
Figure 3:
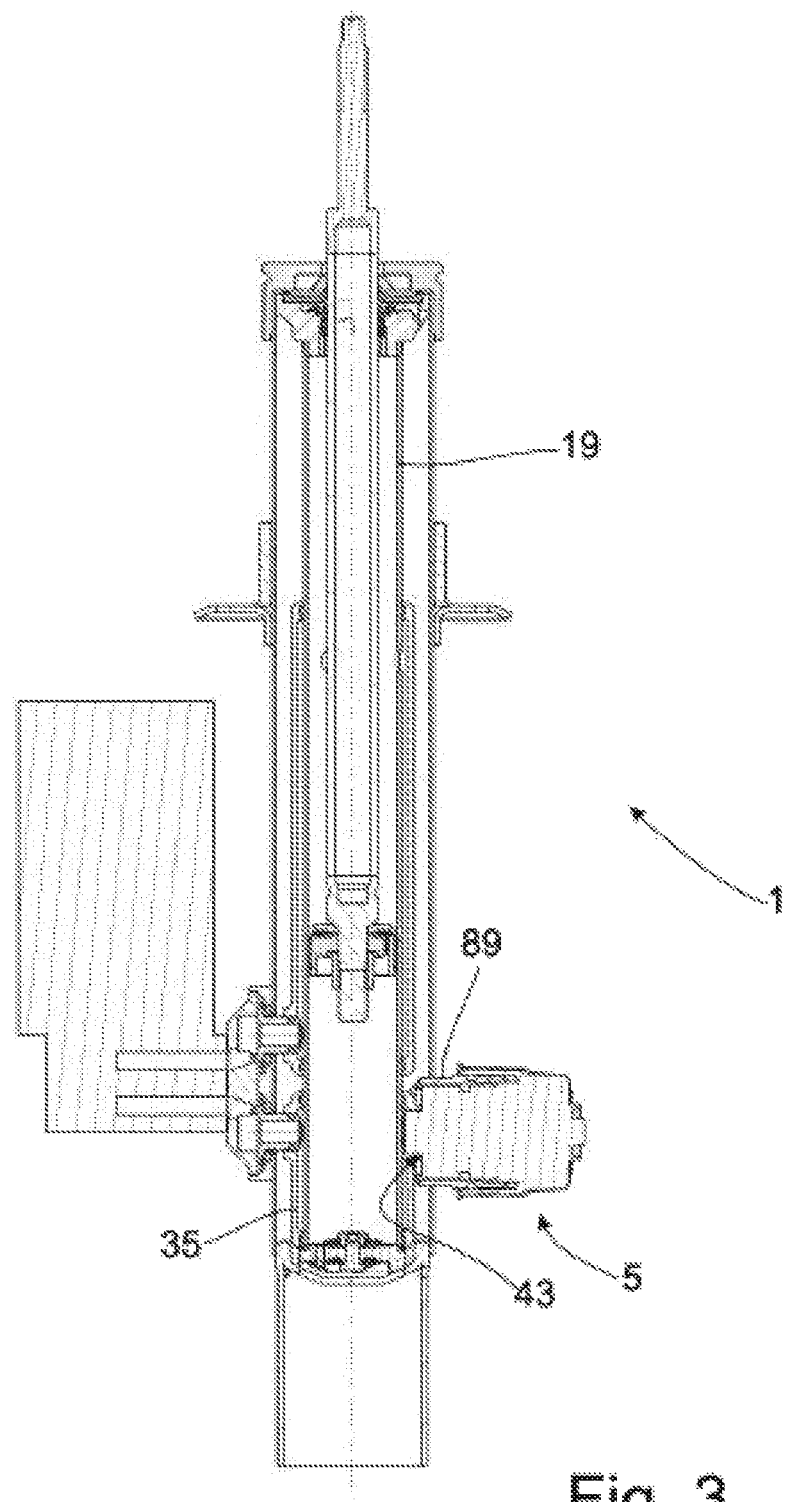

FIGS. 2 and 3 show a vibration damper 1 according to the equivalent diagram of FIG. 1 in two section planes. In addition to the cylinder 19, the vibration damper 1 has an intermediate tube 33; 35, respectively, which is connected to one of the work chambers 15; 17 and one of the adjustable damping valves 3; 5. For this purpose, a connection opening 37 which, with a first fluid connection 11, leads to the first adjustable damper 3 is formed in the work chamber 15 on the piston rod side for the first intermediate tube 33. The work chamber 17 remote of the piston rod also has a connection opening 39 of this kind to a second fluid connection 13. Fluid connections 11; 13 are formed, respectively, by the intermediate tubes 33; 35 and the portions of cylinder 19 enclosed by the intermediate tubes 33; 35.

The two adjustable damping valves 3; 5 are only shown as equivalent diagrams. However, to make it easier to distinguish between them a hydraulic connection 41; 43 is shown which forms the connection between the fluid connection and the connected adjustable damping valve.

Further, it is apparent from FIGS. 2 and 3 that the hydraulic apparatus 23 is connected to the fluid connection 11 of the work chamber 15 on the piston rod side via the first line 29 and is connected to the work chamber 17 remote of the piston rod via the second line 31. In this specific example, the two work chambers 15; 17 have a fluid connection 11; 13 to an adjustable damping valve 3; 5, respectively, and the hydraulic apparatus 23 is connected via its lines 29; 31, respectively, to a fluid connection 11; 13.

Accordingly, each intermediate tube 33; 35 has a separate hydraulic connection 41; 47, respectively, for the adjustable damping valve 3; 5 and for the line 29; 31 to the hydraulic apparatus 23. The hydraulic connections 45; 47 for the hydraulic apparatus 23 are constructed to be offset in circumferential direction relative to the hydraulic connections 41; 43 for the adjustable damping valves 3; 5. Accordingly, the hydraulic connections can be arranged to be axially compact, and the outlets from the adjustable damping valves 3; 5 can be positioned at a short distance from a base 49 of the compensation space 21 so that the damping medium fill state of the compensation space 21 can be minimized. The compensation space 21 extends completely concentric to cylinder 19 and is radially limited by an outer reservoir tube 51. The reservoir tube 51 serves as a support for the hydraulic apparatus 23 and the two adjustable damping valves 3; 5.

Figure 4:
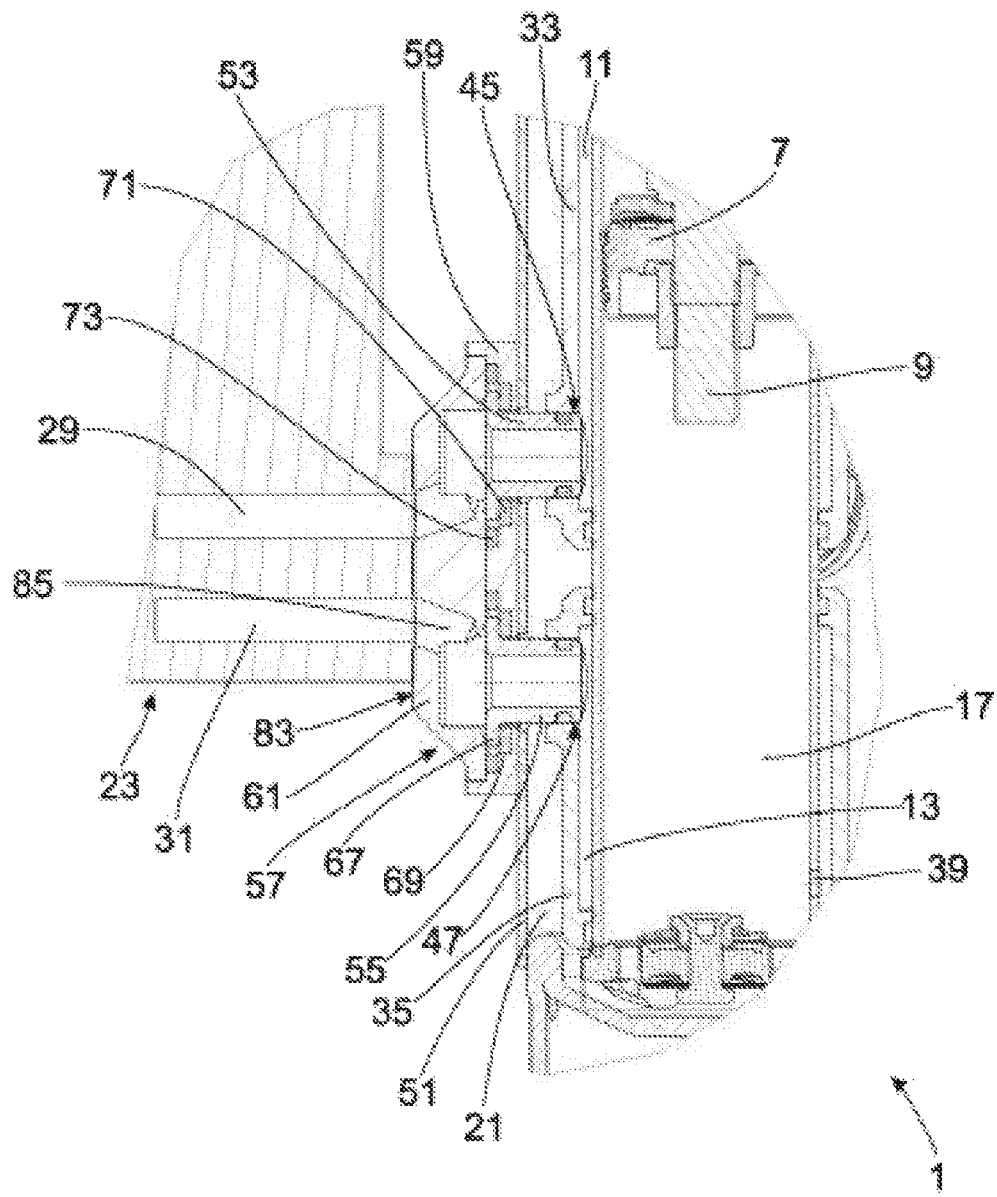
FIG. 4 is a hydraulic apparatus to the vibration damper.

The mechanical and hydraulic connection of the hydraulic apparatus 23 is shown in an enlarged view in FIG. 4. The section plane is selected such that both hydraulic connections 45; 47 of the hydraulic apparatus 23 are discernable. The hydraulic connections 41; 43 of the two adjustable damping valves 3; 5 lie outside of the drawing plane and are therefore not shown.

The hydraulic device 23 has at least one connection sleeve 55; 57 that engages in the hydraulic connections 45; 47 in the intermediate tubes 33; 35 and is connected to the fluid connections 11; 13. The connections sleeves 53; 55 are identically constructed and extend through the reservoir tube 51 into the fluid connection 11; 13. The annular compensation space 21 is bridged in this way.

The two connection sleeves 53; 55 are formed as component parts that are separate from a connection socket 57 for the hydraulic device 23 at the vibration damper 1. The connection socket 57 is fixed to an outer lateral surface of the reservoir tube 51 preferably by means of a bonding method. Therefore, it is also useful to arrange the two hydraulic connections 45; 47 at the shortest possible axial distance.

Figure 5A:
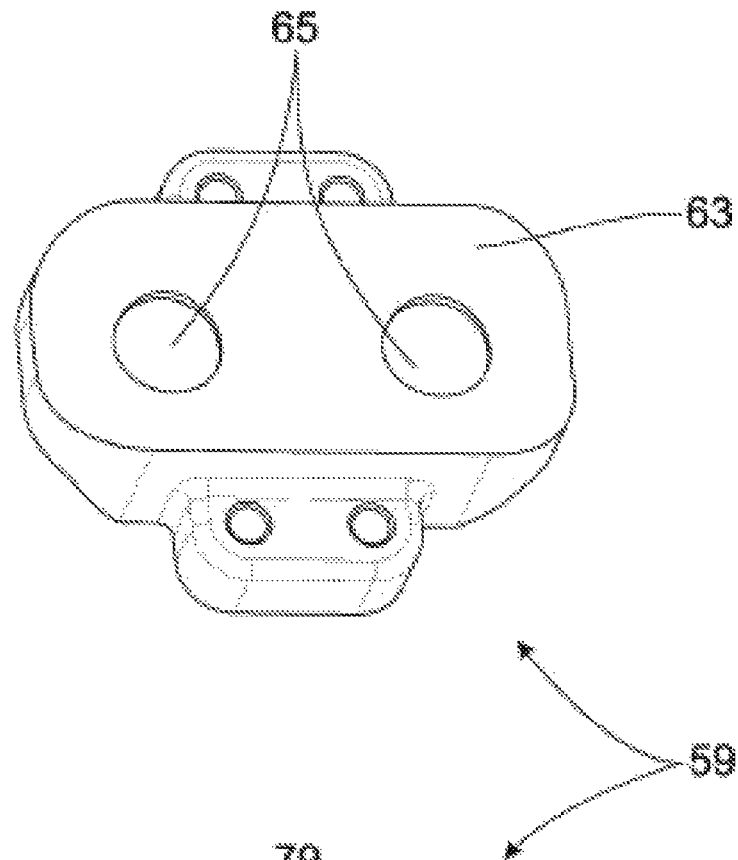
FIGS. 5A and 5B are a bottom part, referring to FIG. 4.
Figure 5B:
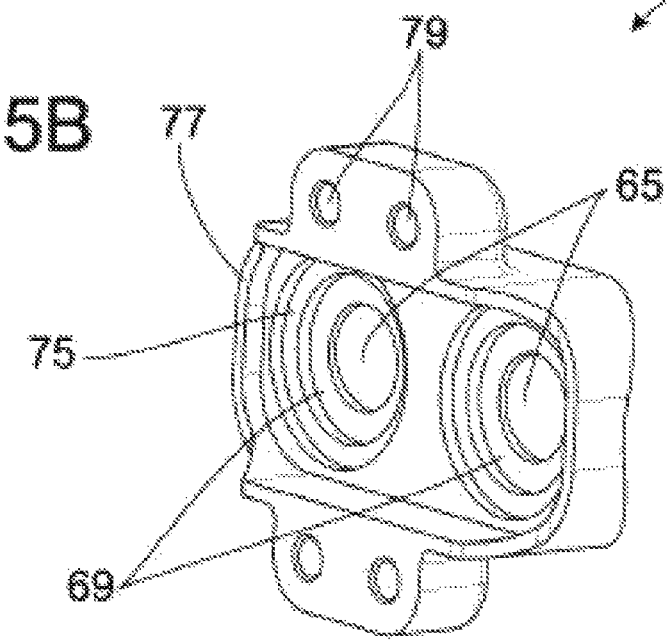
Figure 6A:
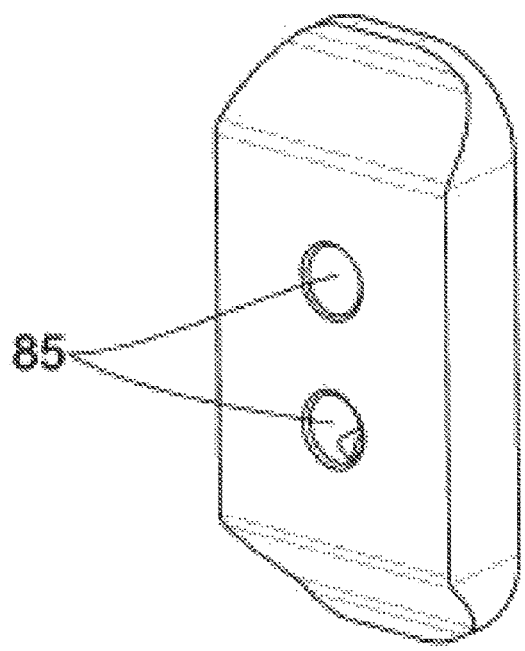
FIGS. 6A and 6B are a cover, referring to FIG. 4.
Figure 6B:
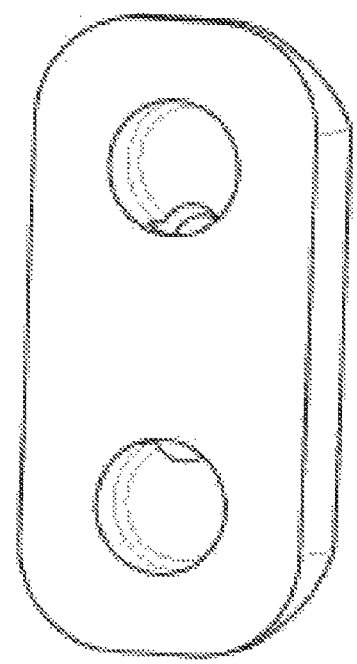

The connection socket 57 comprises a bottom part 59 and a cover 61 which form a housing in which the connection sleeves 53; 55 are fixed. FIGS. 5A and 5B show the bottom part 59 as individual part and FIGS. 6A and 6B show the cover 61 as individual part. The bottom part 59 has a curved contact surface 63 which is adapted to the outer lateral surface of the reservoir tube 51. Two stepped openings 65 are incorporated in the contact surface. The passage diameter of the stepped opening 65 in the contact surface 63 is greater than the outer diameter of the connection sleeves 53; 55 such that the latter are displaceable radial to their longitudinal axis.

Figure 8:
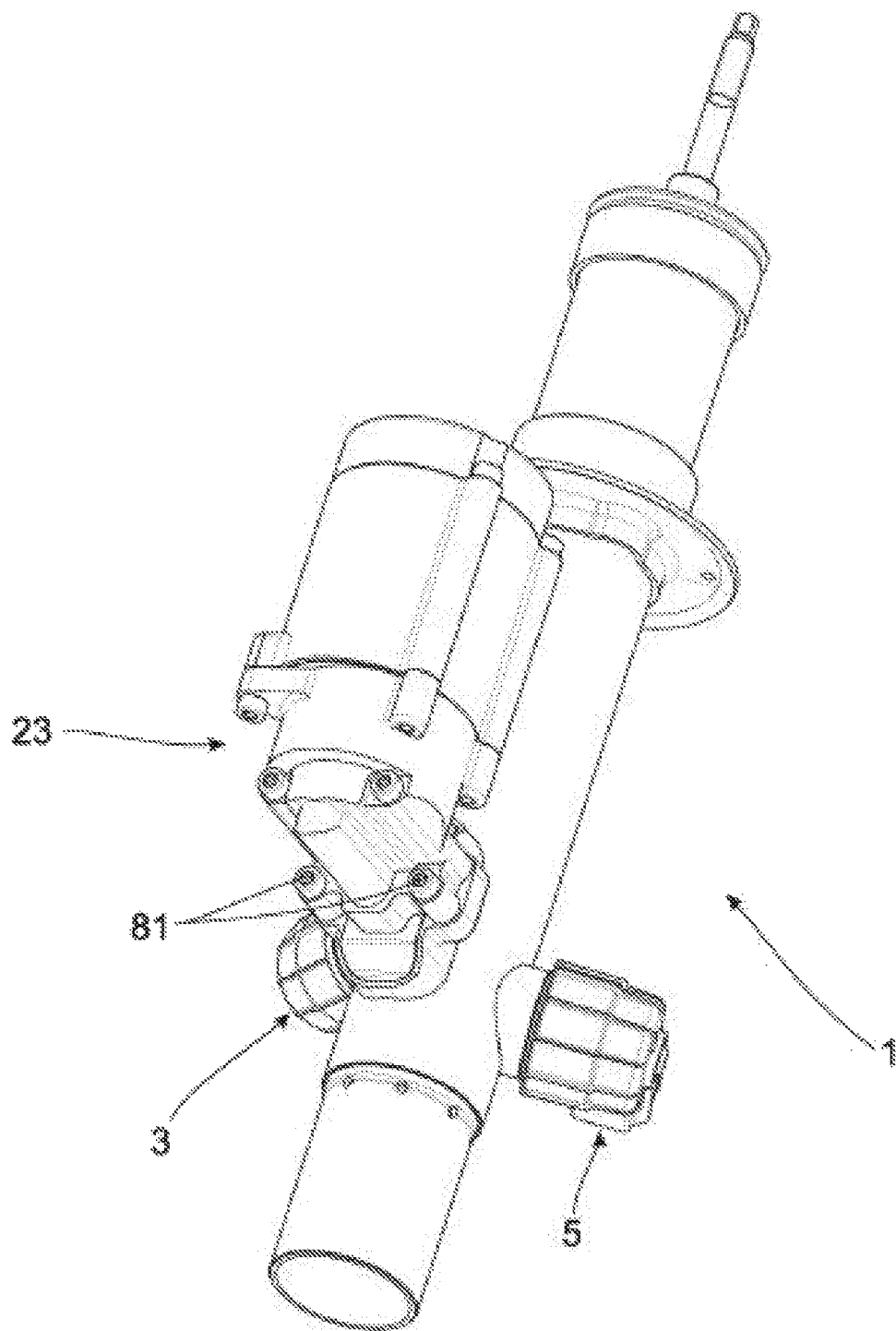
FIG. 8 is an outside view referring to FIGS. 2 and 3.

As is shown in FIG. 4, the connection sleeves 53; 55 have a supporting flange 67 via which the connection sleeves 53; 55 are fixed at least indirectly between the bottom part 59 and the cover 61 of the connection socket 59 in longitudinal direction of the connection sleeves 53; 55. A first annular seal is inserted in a step 69 of the stepped opening 65 below the underside of the supporting flange 67. This seal 71 ensures that the damping medium can flow between the fluid connections 11; 13 and the housing 59; 61 without leaking. A second seal 73 provides for a sealing of the cover 61 relative to the bottom part 59. This seal 73 is likewise arranged in a second step 75 of the stepped opening 75. The cover 61 is held by a circumferential edge 77 of the bottom part 59. Fastening connections 79 for mechanically connecting the hydraulic apparatus 23 are provided radially outside of the circumferential edge 77. In this case, the fastening connections are constructed as threaded bore holes in which clamping screws 81 engage, as shown in FIG. 8.

Figure 7:
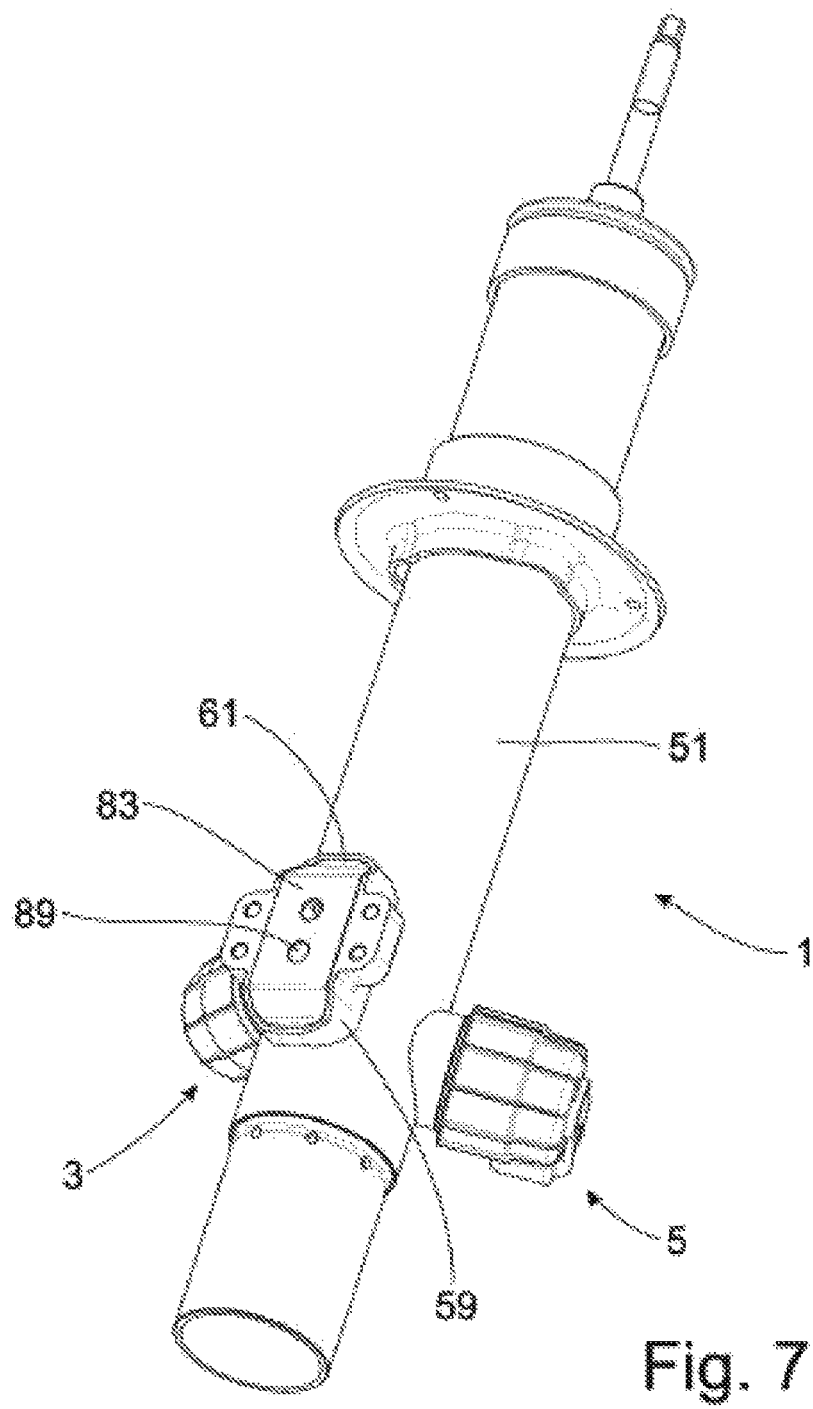
FIG. 7 is a vibration damper according to FIG. 4 without hydraulic apparatus.

FIG. 7 shows the vibration damper 1 with closed housing 59; 61 and a connection surface 83 for the hydraulic apparatus 23 in which passages 85 into lines 29; 31 are formed. It will be apparent from FIG. 8 that clamping screws 81 engage in the threaded bore holes of the housing 59; 61 and that the housing is closed via the hydraulic apparatus 23 with a preloading. The preloading also provides for a preloading of the seals 71; 73 inside the housing 59; 61.

Figure 9:
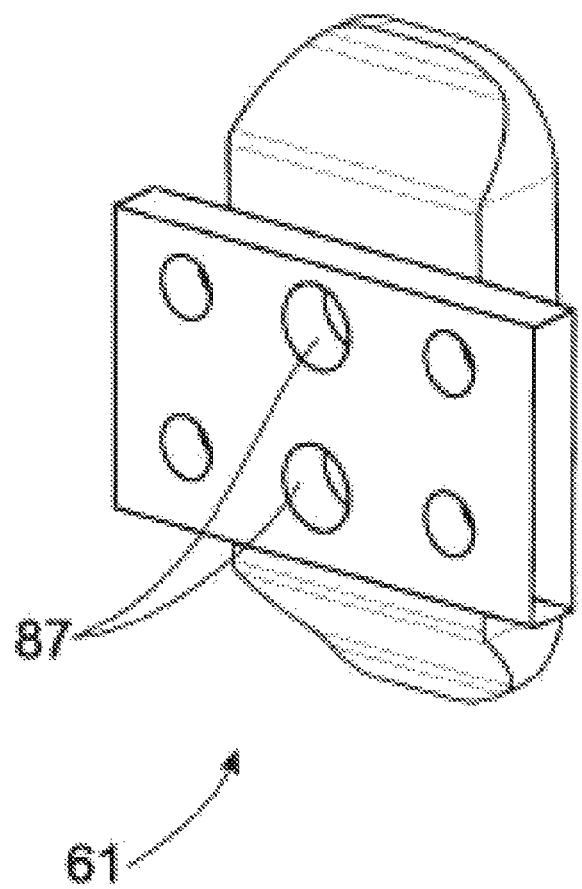
FIG. 9 is a cover for separate arrangement of the hydraulic apparatus.

If it should appear from the installation space conditions that it is not useful to fix the hydraulic apparatus 23 directly to the reservoir tube 51, there is also the possibility that the connection socket 57 has line connections 87 for a separately arranged hydraulic device 23. The cover, for example, with the line connections 87 which are likewise fixed via clamping screws, as shown for example in FIG. 9, which could be used for this purpose.

During assembly, the two intermediate tubes 33; 35 are slid on the cylinder 19, axially positioned and aligned in circumferential direction with respect to the hydraulic connections 41; 47 within the scope of manufacturing possibilities. This constructional unit is inserted into the reservoir tube 51 until one end of the cylinder 19 contacts the reservoir tube 51 at its end. Subsequently, the cylinder 19 is aligned together with the intermediate tubes 33; 35 in circumferential direction until the hydraulic connections 41; 43 for the adjustable damping valves 3; 5 overlap pipe connection pieces 89; 91 at the reservoir tube 51 (see FIGS. 2 and 3) for receiving the adjustable damping valves 3; 5. The adjustable damping valves 3; 5 are then inserted into the hydraulic connections 41; 43 so that the intermediate tubes 33; 35 are fixed in circumferential direction and in longitudinal direction.

In a further step, the connection sleeves 53; 55 are inserted into the bottom part 59 of the connection socket 57. The bottom part 59 is already fixedly connected to the reservoir tube 51. During assembly, the connection sleeves 53; 55 can be displaced radial to the longitudinal axis of the connection sleeve 53; 55. The inserted seals 71 compensate for a certain eccentricity of the connection sleeves 53; 55 with respect to the stepped openings 65 in the bottom part 59. The cover 61 is then placed on top and fixed with the clamping screws 81.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. Adjustable vibration damper comprising:
a cylinder;
piston rod;
at least one adjustable damping valve;
a piston at the piston rod which divides the cylinder into a first work chamber on a piston rod side and a second work chamber on a side remote of the piston rod;
an intermediate tube that at least partially encloses the cylinder and which forms a fluid connection between one of the first and the second work chambers and the at least one adjustable damping valve; and
a hydraulic apparatus connected to the fluid connection of the one of the first and the second work chambers via a first line and to an other of the first and the second work chambers via a second line,
wherein the hydraulic apparatus has at least one connection sleeve connected to the fluid connection to engage in a hydraulic connection in the intermediate tube,
wherein the at least one connection sleeve is a component part separate from a connection socket for the hydraulic apparatus at the vibration damper,
wherein the connection socket comprises a bottom part and a cover that form a housing in which the at least one connection sleeve is fixed,
wherein the at least one connection sleeve is supported with respect to the bottom part so as to be displaceable radially relative to a longitudinal axis of the at least one connection sleeve in an assembled position.

2. The adjustable vibration damper according to claim 1, wherein the intermediate tube has a separate hydraulic connection for the at least one adjustable damping valve and for the first and the second line to the hydraulic apparatus, respectively.

3. The adjustable vibration damper according to claim 2, wherein a hydraulic connection for the hydraulic apparatus is constructed to be offset in circumferential direction with respect to a hydraulic connection for the at least one adjustable damping valve.

4. The adjustable vibration damper according to claim 1, wherein each of the first and the second work chambers have a respective fluid connection to a respective adjustable damping valve and the hydraulic apparatus is connected by the first and the second line to a respective fluid connection.

5. The adjustable vibration damper according to claim 1, wherein the at least one connection sleeve has a supporting flange via which the at least one connection sleeve is fixed.

6. The adjustable vibration damper according to claim 1, wherein the at least one connection sleeve is fixed in longitudinal direction of the at least one connection sleeve at least indirectly between the bottom part and the cover of the connection socket.

7. The adjustable vibration damper according to claim 1, wherein the hydraulic apparatus is fastened to a connection socket.

8. The adjustable vibration damper according to claim 1, wherein a connection socket has line connections for a separately arranged hydraulic device.

* * * * *